US010938919B1

(12) United States Patent
Panchanathan (10) Patent No.: US 10,938,919 B1
(45) Date of Patent: Mar. 2, 2021

(54) REGISTERING CLIENT DEVICES WITH BACKUP SERVERS USING DOMAIN NAME SERVICE RECORDS

(71) Applicant: EMC IP Holding Company LLC, Hopkinton, MA (US)

(72) Inventor: Balaji Panchanathan, Bangalore (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 274 days.

(21) Appl. No.: 14/854,420

(22) Filed: Sep. 15, 2015

(51) Int. Cl.
*H04L 29/08* (2006.01)
*H04L 29/12* (2006.01)
*H04L 29/06* (2006.01)

(52) U.S. Cl.
CPC .......... *H04L 67/16* (2013.01); *H04L 61/1511* (2013.01); *H04L 67/42* (2013.01)

(58) Field of Classification Search
CPC ....... H04L 67/16; H04L 67/42; H04L 61/1511
USPC ......................................................... 709/203
See application file for complete search history.

(56) References Cited

U.S. PATENT DOCUMENTS

| | | | |
|---|---|---|---|
| 2007/0203957 A1* | 8/2007 | Desai | G06F 21/305 |
| 2007/0234115 A1* | 10/2007 | Saika | G06F 11/2028 |
| | | | 714/13 |
| 2008/0098084 A1* | 4/2008 | Volz | H04L 29/12066 |
| | | | 709/217 |
| 2009/0119536 A1* | 5/2009 | Guo | H04L 67/1034 |
| | | | 714/4.1 |
| 2009/0300407 A1* | 12/2009 | Kamath | G06F 9/505 |
| | | | 714/4.11 |
| 2010/0131946 A1* | 5/2010 | Degaonkar | G06F 11/2025 |
| | | | 718/1 |
| 2010/0235409 A1* | 9/2010 | Roy | G06F 17/30094 |
| | | | 707/812 |
| 2011/0184913 A1* | 7/2011 | Hayden | G06F 11/2097 |
| | | | 707/652 |
| 2011/0238626 A1* | 9/2011 | Hao | G06F 11/1464 |
| | | | 707/644 |
| 2011/0271005 A1* | 11/2011 | Bharrat | H04L 65/1063 |
| | | | 709/232 |
| 2012/0136833 A1* | 5/2012 | Bartholomy | G06F 11/2028 |
| | | | 707/644 |
| 2012/0324113 A1* | 12/2012 | Prince | H04L 67/2814 |
| | | | 709/226 |
| 2013/0339298 A1* | 12/2013 | Muller | G06F 17/30283 |
| | | | 707/640 |
| 2014/0181046 A1* | 6/2014 | Pawar | G06F 11/1484 |
| | | | 707/654 |

* cited by examiner

*Primary Examiner* — Umar Cheema
*Assistant Examiner* — Tony Williams
(74) *Attorney, Agent, or Firm* — Dergosits & Noah LLP; Todd A. Noah (57) ABSTRACT

Registering client devices with backup servers by using domain name service records is described. A system stores a location of a backup server associated with a domain name into a domain name service record associated with the domain name. The system receives, from a client device, a domain name service query for the domain name. The system enables the client device to register with the backup server by providing the location of the backup server stored in the domain name service record to the client device.

14 Claims, 3 Drawing Sheets

REGISTERING CLIENT DEVICES WITH BACKUP SERVERS USING DOMAIN NAME SERVICE RECORDS

BACKGROUND

If a software error corrupts a data object, or if erroneous data updates the data object, a data protection administrator may restore the data object to a previous state that does not include the corrupted or erroneous data. A backup/restore application executes a backup operation either occasionally or continuously to enable this restoration, storing a copy of each desired data object state (such as the values of data and these values' embedding in a database's data structures) within dedicated backup files. When the data protection administrator decides to return the data object to a previous state, the data protection administrator specifies the desired previous state by identifying a desired point in time when the data object was in this state, and instructs the backup/restore application to execute a restore operation to restore a copy of the corresponding backup files for that state to the data object.

A data object may be stored on a storage array, which is a disk storage system that includes multiple disk drives. Unlike a disk enclosure, a storage array has cache memory and advanced functionality, such as virtualization and Redundant Array of Independent Disks (RAID). A data protection administrator may manage a backup/restore application to create backups files of data objects and store the backup files of data objects on multiple storage arrays.

DETAILED DESCRIPTION

When a user of a client device wants to register the client device with a backup service that will backup data for the client device, the user has to manually identify the location of a backup server which will provide the backup service for the client device. For example, a customer of an EMC Corporation backup/restore service uses authentication information to log into the EMC Corporation domain EMC.com and select the Internet Protocol address and the port of an EMC Corporation Avamar® backup/restore server which can provide an EMC Corporation backup/restore service for a client device of the customer. Such a process is not only time-consuming and prone to human error, but the customer must repeat this process if the selected backup server becomes unavailable at its current location.

Embodiments herein register client devices with backup servers by using domain name service records. A location of a backup server associated with a domain name is stored into a domain name service record associated with the domain name. A domain name service query for the domain name is received from a client device. The client device is enabled to register with the backup server by providing the location of the backup server stored in the domain name service record to the client device.

For example, a domain name service server stores the Internet Protocol address and a port identification of an EMC Corporation Avamar® backup/restore server into a domain name service record for the EMC Corporation domain EMC.com. The domain name service server receives a domain name service query for the EMC Corporation domain EMC.com from a client device. The domain name service server provides the Internet Protocol address and the port identification of the EMC Corporation Avamar® backup/restore server to the requesting client device, which enables the client device to automatically register with the EMC Corporation Avamar® backup/restore server. Therefore, the domain name service server overcomes the legacy problems of registering client devices with backup servers by eliminating human participation, which also enables the automatic re-registration of a client device with the backup server if the backup server changes its location and enables the automatic registration with another backup server if the original backup server becomes unavailable.

Figure 1:
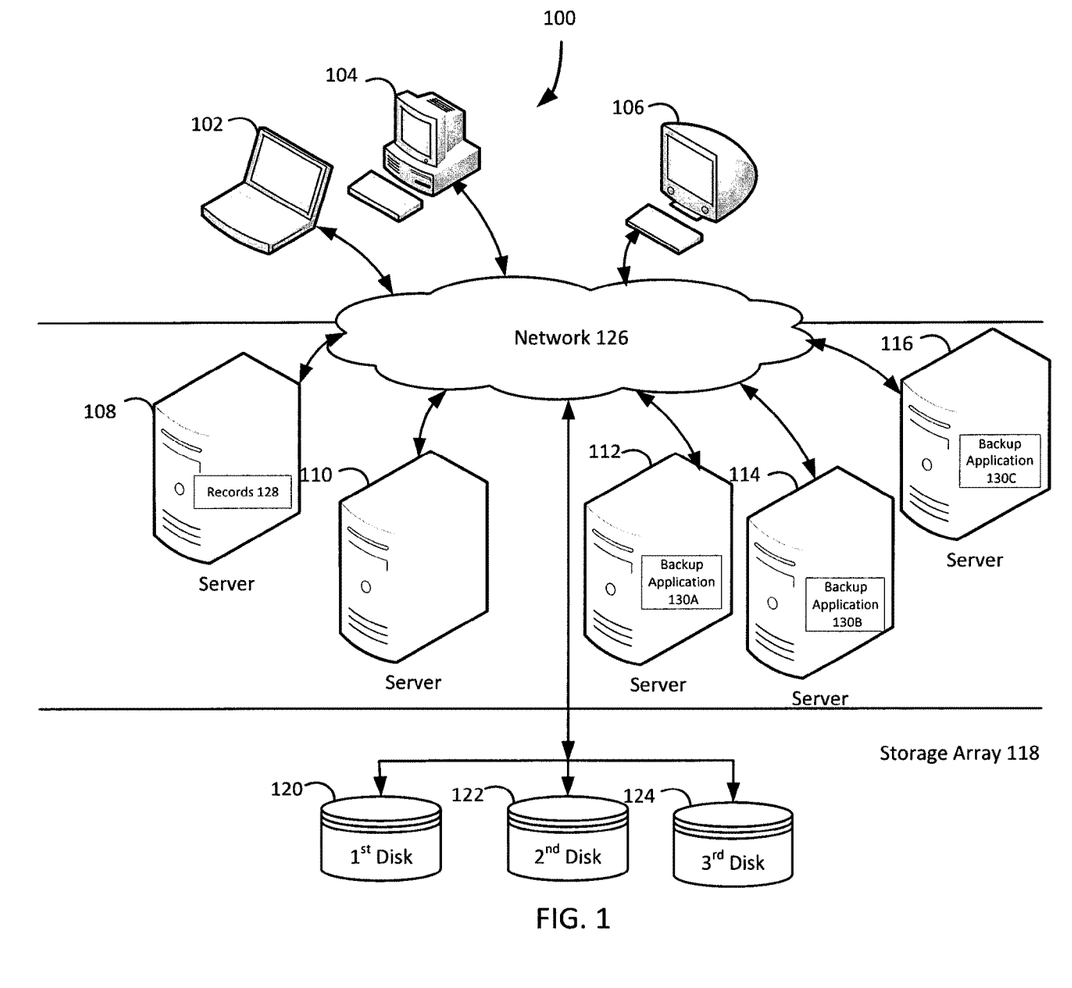
FIG. 1 illustrates a block diagram of an example system for registering client devices with backup servers by using domain name service records, under an embodiment.

FIG. 1 illustrates a diagram of a system that implements registering client devices with backup servers by using domain name service records, under an embodiment. As shown in FIG. 1, a system 100 may illustrate a cloud computing environment in which data, applications, services, and other resources are stored and delivered through shared data-centers and appear as a single point of access for the users. The system 100 may also represent any other type of distributed computer network environment in which servers control the storage and distribution of resources and services for different client users.

In an embodiment, the system 100 represents a cloud computing system that includes a first client 102, a second client 104, and a third client 106; and a first server 108, a second server 110, a third server 112, a fourth server 114, a fifth server 116, and a storage array 118 that may be provided by a hosting company. Although FIG. 1 depicts the first client 102 as a laptop computer 102, the second client 104 as a personal computer 104, and the third client 106 as an I-Mac® 106, each of the clients 102-106 may be any type of computer, including a server. The storage array 118 includes a first disk 120, a second disk 122, and a third disk 124. The clients 102-106, the servers 108-116, and the storage array 118 communicate via a network 126. Although FIG. 1 depicts the system 100 with three clients 102-106, five servers 108-116, one storage array 118, three disks 120-124, and one network 126, the system 100 may include any number of clients 102-106, any number of servers 108-116, any number of storage arrays 118, any number of disks 120-124, and any number of networks 126. The clients 102-106 and the servers 108-116 may each be substantially similar to the system 300 depicted in FIG. 3 and described below.

The first server 108, which may be referred to as a domain name service server 108, includes records 128, which may be referred to as SRV records 128, which are domain name service records used by a domain name service. The second server 110 may be referred to as a management server 110, which manages the use and availability of multiple backup servers, such as the servers 112-116. The third server 112 includes a backup/restore application 130A, the fourth server 114 includes a backup/restore application 130B, and the fifth server 116 includes a backup/restore application 130C. The backup/restore applications 130A-130C are instances of a backup/restore application 130 that create backup files of data objects for the clients 102-106, and execute any requested rollback based on the backup files.

The backup/restore application 130 provides centralized administration, such as scheduling, monitoring, and managing backup operations and backup files. The backup/restore application 130 enables the storing of backup operation schedules, client policies, and client configurations. The backup/restore application 130 provides a unique interface to the clients 102-106 during login, and assists the servers 112-116 in authenticating and registering the clients 102-106. The backup/restore application 130 sends backup/restore work orders to the clients 102-106, which receive and process the work orders to start a backup or restore operation. The backup/restore applications 130A-130C maintain a local database of all processes that execute on the servers 112-116, respectively. The backup/restore application 130 executes server-side processes for a system administrator's graphical management console, which may enable the system administrator to use command line interface tools for queries. For example, a system administrator identifies the clients 102-106 registered with the servers 112-116. Each of the clients 102-106 installs a corresponding plug-in to execute a corresponding client-side process to initiate a corresponding backup registration process.

Although FIG. 1 depicts the backup/restore applications 130A-130C residing completely on the servers 112-116, respectively, the backup/restore applications 130A-130C may reside in any combination of partially on the servers 112-116 and partially on the clients 102-106. Even though the following paragraphs describe EMC Corporation's Avamar® backup/restore application and EMC Corporation's NetWorker® backup/restore application as examples of the backup/restore application 130, the backup/restore application 130 may be any other backup/restore application which provides the backup/restore functionalities described in the Background section.

In one example, the third server 112 backups up data created by the Microsoft Windows® operating system for the first client 102 and stores the Microsoft Windows® data onto the first disk 120, the fourth server 114 backups up data created by the Linux® operating system for the second client 104 and stores the Linux® data onto the second disk 122, and the fifth server 116 backups up data created by the Mac OS® operating system on the third client 106 and stores the Mac OS® data onto the third disk 124. In another example, the third server 112 backups up data created by the Mac OS® operating system for the first client 102 and stores the Mac OS® data onto the first disk 120, the fourth server 114 backups up data created by the Mac OS® operating system for the second client 104 and stores the Mac OS® data onto the second disk 122, and the fifth server 116 backups up data created by the Mac OS® operating system on the third client 106 and stores the Mac OS® data onto the third disk 124.

In another example, the third server 112 backups up data created by the Mac OS® operating system for the first client 102 and stores the Mac OS® data onto the first disk 120, the fourth server 114 backups up data created by the Mac OS® operating system for the second client 104 and stores the Mac OS® data onto the first disk 120, and the fifth server 116 backups up data created by the Mac OS® operating system on the third client 106 and stores the Mac OS® data onto the first disk 120. In a further example, the third server 112 backups up data created by the Mac OS® operating system for the first client 102 and stores the Mac OS® data onto the first disk 120, the third server 112 backups up data created by the Mac OS® operating system for the second client 104 and stores the Mac OS® data onto the second disk 122, and the third server 112 backups up data created by the Mac OS® operating system on the third client 106 and stores the Mac OS® data onto the third disk 124.

In an additional example, the third server 112 backups up data created by the Mac OS® operating system for the first client 102 and stores the Mac OS® data onto the first disk 120, the third server 112 backups up data created by the Mac OS® operating system for the second client 104 and stores the Mac OS® data onto the first disk 120, and the third server 112 backups up data created by the Mac OS® operating system on the third client 106 and stores the Mac OS® data onto the first disk 120. Although the preceding examples describe different configurations for backup servers backing up data created by operating systems for different clients and storing the data onto disks in a storage array, any number of configurations may be implemented for any number of backup servers backing up data created by any number of operating systems for any number of clients and storing the data onto any number of disks in any number of storage arrays.

The backup/restore application 130 may be EMC Corporation's Avamar® backup/restore application, which provides fast, efficient backup and recovery through a complete software and hardware solution. Equipped with integrated variable-length deduplication technology, EMC Corporation's Avamar® backup/restore application facilitates fast, periodic full backups for virtual environments, remote offices, enterprise applications, network access servers, and desktops/laptops. Data deduplication significantly reduces backup time by only storing unique periodic changes, while always maintaining periodic full backups for immediate single-step restore. The transmission of deduplicated backup sends only changed blocks, reducing network traffic. EMC Corporation's Avamar® backup/restore application leverages existing local area network and wide area network bandwidth for enterprise-wide and remote/branch office backup and recovery. Every backup is a full backup, which makes it easy for users to browse, point, and click for a single-step recovery. EMC Corporation's Avamar® data store features redundant power and networking, redundant array of independent disks, and redundant array of inexpensive nodes technology to provide uninterrupted data accessibility. Periodic data systems checks ensure recoverability whenever needed. EMC Corporation's Avamar® systems can be deployed in an integrated solution with EMC Corporation's Data Domain® systems for high-speed backup and recovery of specific data types.

The backup/restore application 130 may be an EMC Corporation's NetWorker® backup/restore application, which is a suite of enterprise level data protection software that unifies and automates backup to tape, disk-based, and flash-based storage media across physical and virtual environments for granular and disaster recovery. Cross-platform support is provided for many environments, including Microsoft Windows®. A central NetWorker® server manages a data zone that contains backup clients and NetWorker® storage nodes that access the backup media. The NetWorker® management console software provides a graphic user interface for functions such as client configuration, policy settings, schedules, monitoring, reports, and daily operations for deduplicated and non-deduplicated backups. The core NetWorker® software backs up client file systems and operating system environments. Add-on database and application modules provide backup services for products such as Microsoft® Exchange Server. Client backup data can be sent to a remote NetWorker® storage node or stored on a locally attached device by the use of a dedicated storage node. EMC Corporation's NetWorker® modules for Microsoft® applications supports Microsoft® products such as Microsoft® Exchange, Microsoft® Sharepoint, Microsoft® SQL Server, and Microsoft® Hyper-V servers.

A determination may be made whether a backup server is available for enabling client device backups. For example, the management server 110 determines that the third server 112, which is an EMC Corporation Avamar® backup/restore server, is available for enabling client device backups of Microsoft Windows® data. The management server 110 continually monitors the load and the capacity of EMC Corporation Avamar® backup/restore server 112 to determine availability after the EMC Corporation Avamar® backup/restore server 112 is initialized in the system 100. If the EMC Corporation Avamar® backup/restore server 112 is not managed by any management server, such as the management server 110, then the EMC Corporation Avamar® backup/restore server 112 determines itself whether it is available for enabling client device backups of Microsoft Windows® data by continually monitoring its load and capacity after it is initialized in the system 100.

The domain name service server 108 stores a location of a backup server associated with a domain name into a domain name service record associated with the domain name. For example, the domain name service server 108 receives the Internet Protocol address and a port identification for EMC Corporation Avamar® backup/restore server 112, which is associated with the EMC.com domain name and Microsoft Windows® data, from the management server 110, and stores the Internet Protocol address and the port identification for the EMC Corporation Avamar® backup/restore server 112 and an identification of Microsoft Windows® data into the records 128 for the EMC.com domain name. In another example, the domain name service server 108 receives the Internet Protocol address and a port identification for the EMC Corporation Avamar® backup/restore server 112, which is associated with the EMC.com domain name and Microsoft Windows® data, from the EMC Corporation Avamar® backup/restore server 112, and stores the Internet Protocol address and the port identification for the EMC Corporation Avamar® backup/restore server 112 and an identification of Microsoft Windows® data into the records 128 for the EMC.com domain name.

The domain name service server 108 receives a domain name service query for a domain name from a client device. For example, the domain name service server 108 receives a domain name service query for the EMC Corporation domain EMC.com and an identification of Microsoft Windows® data from a plug-in that is initiating the backup registration process on the client device 102.

The domain name service server 108 enables a client device to register with a backup server by providing a location of the backup server stored in a domain name service record to the client device. For example, the domain name service server 108 provides the Internet Protocol address and the port identification of the EMC Corporation Avamar® backup/restore server 112 to the plug-in in the requesting client device 102 because the received domain name service query identified Microsoft Windows® data and the records 128 also identified Microsoft Windows® data for the EMC Corporation Avamar® backup/restore server 112. By providing this location from the records 128, the domain name service server 108 enables the client device 102 to automatically register with the EMC Corporation Avamar® backup/restore server 112. Continuing this example, if the received domain name service query identifies Mac OS® data, the domain name service server 108 provides the Internet Protocol address and the port identification of the third server 116, which is also an EMC Corporation Avamar® backup/restore server, to the plug-in in the requesting client device 102 because the records 128 also identified Mac OS® data for the EMC Corporation Avamar® backup/restore server 116.

If a backup server malfunctions, loses communications, is overloaded, or changes locations, the backup server becomes unavailable for enabling client device backups at the backup server's location, such that any subsequent attempts to backup data via the backup server's location will fail. The domain name service server 108 may delete a location of a backup server in a domain name service record in response to a determination that the backup server is unavailable for enabling client device backups at the location. For example, the domain name service server 108 deletes the Internet Protocol address and the port identification for the EMC Corporation Avamar® backup/restore server 112 from the records 128 because the management server 110 determines that the EMC Corporation Avamar® backup/restore server 112 is unavailable for enabling client device backups using the Internet Protocol address and the identified port.

In another example, the domain name service server 108 deletes the Internet Protocol address and the port identification for the EMC Corporation Avamar® backup/restore server 112 from the records 128 because the EMC Corporation Avamar® backup/restore server 112 determines that it is unavailable for enabling client device backups using the Internet Protocol address and the identified port. After the domain name service server 108 deletes a location of a backup server, in a domain name service record, which was used by a client device to register with a backup server, the plug-in for the client device may attempt to either register with a different backup server or to re-register with the same backup server via a new location.

The domain name service server 108 may provide a location of a different backup server stored in a different domain name service record to a client device in response to a determination that a backup server is unavailable for enabling client device backups at the location of the backup server. For example, the domain name service server 108 provides the Internet Protocol address and the port identification of the fourth server 114, which is also an EMC Corporation Avamar® backup/restore server, to the requesting client device 102, which enables the client device 102 to automatically register with the EMC Corporation Avamar® backup/restore server 114, provided that the EMC Corporation Avamar® backup/restore server 114 enables backup of the same type of operating system data as the data stored by the client device 102. Alternatively, the domain name service server 108 may provide a new location of a backup server stored in a domain name service record to a client device in response to an identification of the new location of the backup server. For example, the domain name service server 108 provides the new Internet Protocol address and the port identification of the EMC Corporation Avamar® backup/restore server 112 to the requesting client device 102, which enables the client device 102 to automatically re-register with the EMC Corporation Avamar® backup/restore server 112.

Figure 2:
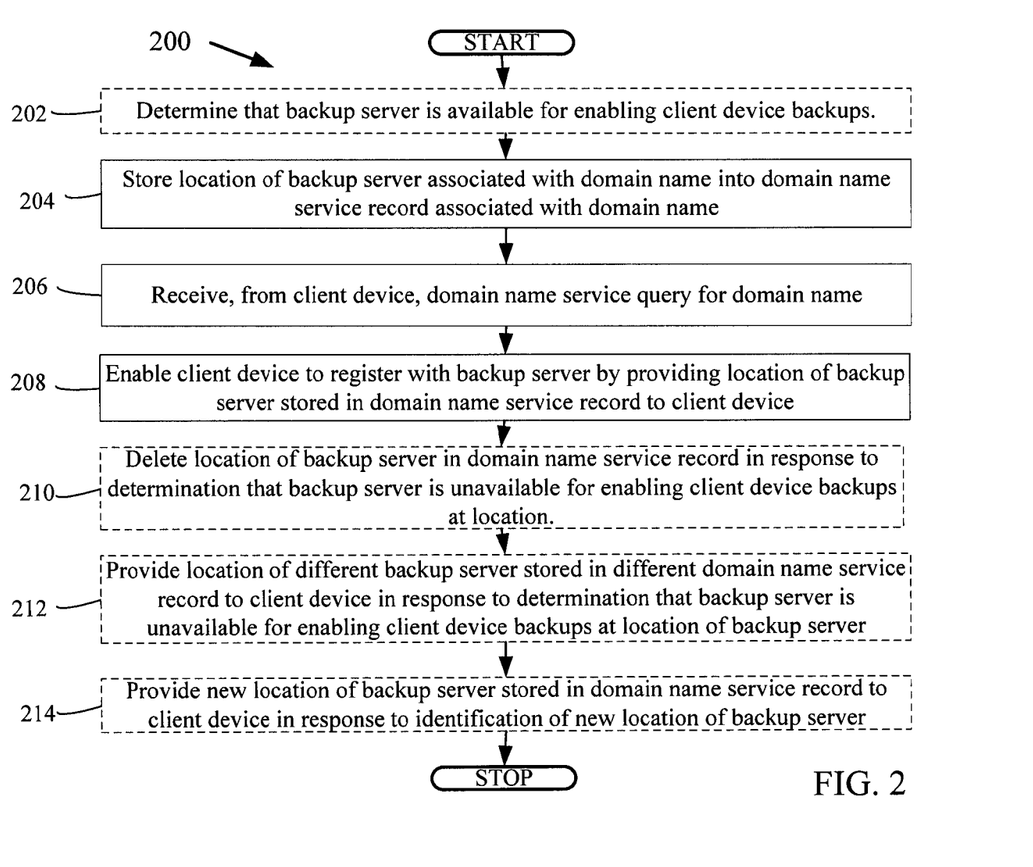
FIG. 2 is a flowchart that illustrates a method of registering client devices with backup servers by using domain name service records, under an embodiment.

FIG. 2 is a flowchart that illustrates a method for registering client devices with backup servers by using domain name service records, under an embodiment. Flowchart 200 illustrates method acts illustrated as flowchart blocks for certain steps involved in and/or between the clients 102-106 and/or the servers 108-116 of FIG. 1.

A determination is optionally made that a backup server is available for enabling client device backups, block 202. For example, the management server 110 determines that the EMC Corporation Avamar® backup/restore server 112 is available for enabling client device backups.

A location of a backup server associated with a domain name is stored into a domain name service record associated with the domain name, block 204. For example, the domain name service server 108 receives the Internet Protocol address and a port identification for the EMC Corporation Avamar® backup/restore server 112, which is associated with the EMC.com domain name, from the management server 110, and stores the Internet Protocol address and the port identification for the EMC Corporation Avamar® backup/restore server 112 into the records 128 for the EMC.com domain name.

A domain name service query for a domain name is received from a client device, block 206. For example, the domain name service server 108 receives a domain name service query for the EMC Corporation domain EMC.com from the client device 102.

A client device is enabled to register with a backup server by providing a location of the backup server stored in a domain name service record to the client device, block 208. For example, the domain name service server 108 provides the Internet Protocol address and the port identification of the EMC Corporation Avamar® backup/restore server 112 to the requesting client device 102, which enables the client device 102 to automatically register with the EMC Corporation Avamar® backup/restore server 112.

A location of a backup server is optionally deleted in a domain name service record in response to a determination that the backup server is unavailable for enabling client device backups at the location, block 210. For example, the domain name service server 108 deletes the Internet Protocol address and the port identification for the EMC Corporation Avamar® backup/restore server 112 from the records 128 because the management server 110 determines that the EMC Corporation Avamar® backup/restore server 112 is unavailable for enabling client device backups at the Internet Protocol address and the identified port.

A location of a different backup server stored in a different domain name service record is optionally provided to a client device in response to a determination that a backup server is unavailable for enabling client device backups at the location of the backup server, block 212. For example, the domain name service server 108 provides the Internet Protocol address and the port identification of the EMC Corporation Avamar® backup/restore server 114 to the requesting client device 102, which enables the client device 102 to automatically register with the EMC Corporation Avamar® backup/restore server 114.

A new location of a backup server stored in a domain name service record is optionally provided to a client device in response to an identification of the new location of the backup server, block 214. For example, the domain name service server 108 provides the new Internet Protocol address and the port identification of the EMC Corporation Avamar® backup/restore server 112 to the requesting client device 102, which enables the client device 102 to automatically re-register with the EMC Corporation Avamar® backup/restore server 112.

Although FIG. 2 depicts the blocks 202-214 occurring in a specific order, the blocks 202-214 may occur in another order. In other implementations, each of the blocks 202-214 may also be executed in combination with other blocks and/or some blocks may be divided into a different set of blocks.

Figure 3:
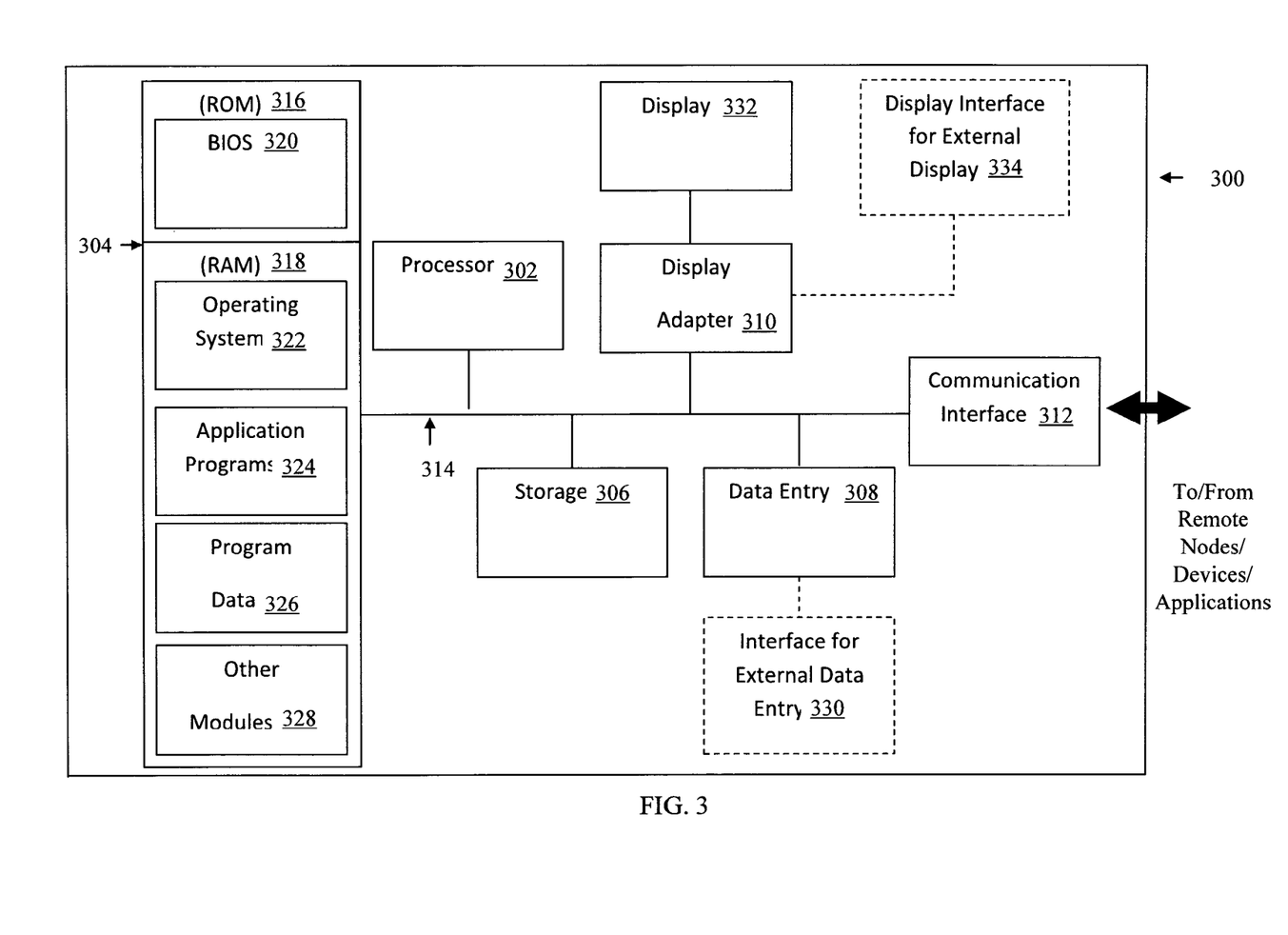
FIG. 3 is a block diagram illustrating an example hardware device in which the subject matter may be implemented.

Having describing the subject matter in detail, an exemplary hardware device in which the subject matter may be implemented shall be described. Those of ordinary skill in the art will appreciate that the elements illustrated in FIG. 3 may vary depending on the system implementation. With reference to FIG. 3, an exemplary system for implementing the subject matter disclosed herein includes a hardware device 300, including a processing unit 302, memory 304, storage 306, a data entry module 308, a display adapter 310, a communication interface 312, and a bus 314 that couples the elements 304-312 to the processing unit 302.

The bus 314 may comprise any type of bus architecture. Examples include a memory bus, a peripheral bus, a local bus, etc. The processing unit 302 is an instruction execution machine, apparatus, or device and may comprise a microprocessor, a digital signal processor, a graphics processing unit, an application specific integrated circuit (ASIC), a field programmable gate array (FPGA), etc. The processing unit 302 may be configured to execute program instructions stored in the memory 304 and/or the storage 306 and/or received via the data entry module 308.

The memory 304 may include read only memory (ROM) 316 and random access memory (RAM) 318. The memory 304 may be configured to store program instructions and data during operation of the hardware device 300. In various embodiments, the memory 304 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. The memory 304 may also include nonvolatile memory technologies such as nonvolatile flash RAM (NVRAM) or ROM. In some embodiments, it is contemplated that the memory 304 may include a combination of technologies such as the foregoing, as well as other technologies not specifically mentioned. When the subject matter is implemented in a computer system, a basic input/output system (BIOS) 320, containing the basic routines that help to transfer information between elements within the computer system, such as during start-up, is stored in the ROM 316.

The storage 306 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 300.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 306, the ROM 316 or the RAM 318, including an operating system 322, one or more applications programs 324, program data 326, and other program modules 328. A user may enter commands and information into the hardware device 300 through the data entry module 308. The data entry module 308 may include mechanisms such as a keyboard, a touch screen, a pointing device, etc. Other external input devices (not shown) are connected to the hardware device 300 via an external data entry interface 330. By way of example and not limitation, external input devices may include a microphone, joystick, game pad, satellite dish, scanner, or the like. In some embodiments, external input devices may include video or audio input devices such as a video camera, a still camera, etc. The data entry module 308 may be configured to receive input from one or more users of the hardware device 300 and to deliver such input to the processing unit 302 and/or the memory 304 via the bus 314.

A display 332 is also connected to the bus 314 via the display adapter 310. The display 332 may be configured to display output of the hardware device 300 to one or more users. In some embodiments, a given device such as a touch screen, for example, may function as both the data entry module 308 and the display 332. External display devices may also be connected to the bus 314 via an external display interface 334. Other peripheral output devices, not shown, such as speakers and printers, may be connected to the hardware device 300.

The hardware device 300 may operate in a networked environment using logical connections to one or more remote nodes (not shown) via the communication interface 312. The remote node may be another computer, a server, a router, a peer device or other common network node, and typically includes many or all of the elements described above relative to the hardware device 300. The communication interface 312 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, the communication interface 312 may include logic configured to support direct memory access (DMA) transfers between the memory 304 and other devices.

In a networked environment, program modules depicted relative to the hardware device 300, or portions thereof, may be stored in a remote storage device, such as, for example, on a server. It will be appreciated that other hardware and/or software to establish a communications link between the hardware device 300 and other devices may be used.

It should be understood that the arrangement of the hardware device 300 illustrated in FIG. 3 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of the hardware device 300.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 3.

Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description herein, the subject matter is described with reference to acts and symbolic representations of operations that are performed by one or more devices, unless indicated otherwise. As such, it is understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is described in this context, it is not meant to be limiting as those of skill in the art will appreciate that various of the acts and operations described herein may also be implemented in hardware.

To facilitate an understanding of the subject matter described, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A system for registering client devices with backup servers by using domain name service records, the system comprising:
   a processor-based application stored on a non-transitory computer-readable medium, which when executed on a computer, will cause one or more processors to:
   store a location of a backup server associated with a single domain name and an identification of an operating system associated with a backup type which the backup server stores into a domain name service record associated with the single domain name, the backup server being configured to use any backup application to create backup files of data for any client device, the single domain name being associated with a plurality of backup servers;
   receive, from a client device, a domain name service query for the single domain name, the domain service query comprising both the single domain name and an identification of an operating system associated with the client device;
   determine the identification of the operating system included in the domain name service record associated with the single domain name is the same as the identification of the operating system associated with the client device included in the domain service query;
   provide the location of the backup server stored in the domain name service record to the client device in response to receiving the domain name service query and in response to a determination that the identification of the operating systems associated with i) the backup type which the backup server stores, and ii) the client device are compatible, the providing the location of the backup server causing the client device to automatically register with the backup server to use a backup application to create backup files of data for the client device; and
   provide a location of a different backup server stored in a different domain name service record to the client device in response to receiving the domain name service query and in response to a determination that the backup server is unavailable for enabling client device backups at the location of the backup server.

2. The system of claim 1, wherein the backup server comprises an internet protocol address of the backup server and a port identification of the backup server.

3. The system of claim 1, wherein storing the location of the backup server into the domain name service record is in response to a determination that the backup server is available for enabling client device backups.

4. The system of claim 1, wherein the processor-based application further causes the processor to delete the location of the backup server in the domain name service record in response to a determination that the backup server is unavailable for enabling client device backups at the location.

5. The system of claim 1, wherein the processor-based application further causes the processor to provide a new location of the backup server stored in the domain name service record to the client device in response to receiving the domain name service query and in response to an identification of the new location of the backup server.

6. A computer-implemented method for registering client devices with backup servers by using domain name service records, the method comprising:
   storing a location of a backup server associated with a single domain name and an identification of an operating system associated with a backup type which the backup server stores into a domain name service record associated with the single domain name, the backup server being configured to use any backup application to create backup files of data for any client device, the single domain name being associated with a plurality of backup servers;
   receiving, from a client device, a domain name service query for the single domain name, the domain service query comprising both the single domain name and an identification of an operating system associated with the client device;
   determining the identification of the operating system included in the domain name service record associated with the single domain name is the same as the identification of the operating system associated with the client device included in the domain service query;
   providing the location of the backup server stored in the domain name service record to the client device in response to receiving the domain name service query and in response to a determination that the identification of the operating systems associated with i) the backup type which the backup server stores, and ii) the client device are compatible, the providing the location of the backup server causing the client device to automatically register with the backup server to use a backup application to create backup files of data for the client device; and
   providing a location of a different backup server stored in a different domain name service record to the client device in response to receiving the domain name service query and in response to a determination that the backup server is unavailable for enabling client device backups at the location of the backup server.

7. The method of claim 6, wherein storing the location of the backup server into the domain name service record is in response to a determination that the backup server is available for enabling client device backups.

8. The method of claim 6, wherein the method further comprises deleting the location of the backup server in the domain name service record in response to a determination that the backup server is unavailable for enabling client device backups at the location.

9. The method of claim 6, wherein the method further comprises providing a new location of the backup server stored in the domain name service record to the client device in response to receiving the domain name service query and in response to an identification of the new location of the backup server.

10. A computer program product, comprising a non-transitory computer-readable medium having a computer-readable program code embodied therein to be executed by one or more processors, the program code including instructions to:
   store a location of a backup server associated with a single domain name and an identification of an operating system associated with a backup type which the backup server stores into a domain name service record associated with the single domain name, the backup server being configured to use any backup application to create backup files of data for any client device, the single domain name being associated with a plurality of backup servers;

receive, from a client device, a domain name service query for the single domain name, the domain service query comprising both the single domain name and an identification of an operating system associated with the client device;

determine the identification of the operating system included in the domain name service record associated with the single domain name is the same as the identification of the operating system associated with the client device included in the domain service query;

provide the location of the backup server stored in the domain name service record to the client device in response to receiving the domain name service query and in response to a determination that the identification of the operating systems associated with i) the backup type which the backup server stores, and ii) the client device are compatible, the providing the location of the backup server causing the client device to automatically register with the backup server to use a backup application to create backup files of data for the client device; and provide a location of a different backup server stored in a different domain name service record to the client device in response to receiving the domain name service query and in response to a determination that the backup server is unavailable for enabling client device backups at the location of the backup server.

11. The computer program product of claim 10, wherein the backup server comprises an internet protocol address of the backup server and a port identification of the backup server.

12. The computer program product of claim 10, wherein storing the location of the backup server into the domain name service record is in response to a determination that the backup server is available for enabling client device backups.

13. The computer program product of claim 10, wherein the program code includes further instructions to delete the location of the backup server in the domain name service record in response to a determination that the backup server is unavailable for enabling client device backups at the location.

14. The computer program product of claim 10, wherein the program code includes further instructions to provide a new location of the backup server stored in the domain name service record to the client device in response to receiving the domain name service query and in response to an identification of the new location of the backup server.

* * * * *